US007139377B2

(12) United States Patent
Pinault

(10) Patent No.: US 7,139,377 B2
(45) Date of Patent: Nov. 21, 2006

(54) METHOD OF PROVIDING SERVICES TO REMOTE PRIVATE TERMINALS AND AN ASSOCIATED DEVICE

(75) Inventor: Francis Pinault, Bois-Colombes (FR)

(73) Assignee: Alcatel, Paris (FR)

( * ) Notice: Subject to any disclaimer, the term of this patent is extended or adjusted under 35 U.S.C. 154(b) by 788 days.

(21) Appl. No.: 10/391,656

(22) Filed: Mar. 20, 2003

(65) Prior Publication Data

US 2003/0179872 A1 Sep. 25, 2003

(30) Foreign Application Priority Data

Mar. 25, 2002 (FR) .................................. 02 03692

(51) Int. Cl.
*H04M 3/42* (2006.01)
*H04M 7/00* (2006.01)

(52) U.S. Cl. ............................ 379/201.01; 379/220.01

(58) Field of Classification Search ........... 379/201.01, 379/201.04, 201.05, 220.01, 221.02, 221.15, 379/229, 230, 233, 243
See application file for complete search history.

(56) References Cited

U.S. PATENT DOCUMENTS 4,899,373 A 2/1990 Lee et al.
6,707,811 B1 * 3/2004 Greenberg et al. .......... 370/352
2002/0146109 A1 * 10/2002 Sahala
2003/0091024 A1 * 5/2003 Stumer
2005/0059390 A1 * 3/2005 Sayers et al.

OTHER PUBLICATIONS

M. Atoui, Virtual Private Network call Processing in the Intelligent Network, Discovering a New World of Communications, Chicago, Jun. 14-18, 199, Bound Together With B0190700, vol. 3, Proceedings of the International Conferences on Communications, NY, IEEE, vol. 4, Jun. 14, 1992, pp. 561-565, XP010062114.

J. Carnazza et al, "PCS Data management in an intelligent network", Universal Personal Communications, 1992. ICUPC '92 Proceedings., 1st International Conference, Dallas, Texas, USA, Sep. 29-Oct. 1, 1992, New York, NY, pp. 1204-1-1204-5, XP010061041.

* cited by examiner

*Primary Examiner*—William J. Deane, Jr.
(74) *Attorney, Agent, or Firm*—Sughrue Mion, PLLC

(57) ABSTRACT

A method is disclosed of providing services to private terminals belonging to a private network including a private database which contains primary identifiers of the private terminals associated with first data representative of services to which the private terminals have access within the private network and which can be connected to a public network including an intelligent platform and connected to the private network. The method includes a first step in which there is stored, at an address accessible to the intelligent platform, second data representative of at least a portion of the private database and, at an address of the public network, third data representative of the primary identifier of each private terminal, of the associated private network, and of the intelligent platform having access to the second data of the private network. In a second step, if a private terminal sends a service request over the public network, the third data associated with the primary identifier of the requesting private terminal is extracted, after which the data of the request is compared to the second data designated by the extracted third data to authorize or not the platform designated by the extracted third data to implement the required service.

24 Claims, 1 Drawing Sheet

ADB1
ADB2
ADBn
LS
R3
MT3
AM
INP
FT1
CS
EM
PUN 1 / PUN2 / PUN3
MT4
MT1
MT2
FT1-2
PRN1
PDB1
R3
FT2-2
PDB2
PRN2
FT1-1
MT5
FT3-2

METHOD OF PROVIDING SERVICES TO REMOTE PRIVATE TERMINALS AND AN ASSOCIATED DEVICE

CROSS-REFERENCE TO RELATED APPLICATIONS

This application is based on French Patent Application No. 02 03 692 filed Mar. 25, 2002, the disclosure of which is hereby incorporated by reference thereto in its entirety, and the priority of which is hereby claimed under 35 U.S.C. § 119.

BACKGROUND OF THE INVENTION

1. Field of the Invention

The field of the invention is that of communication between terminals of different networks, and more particularly that of providing private services to terminals disconnected from their private network.

2. Description of the Prior Art

Many networks, usually private ones, offer users specific services when their terminals are connected to the network, such as access to databases or private messaging services and display of their name on the screen of the terminal of the user with whom they are communicating.

Because users are often physically disconnected from their private network, for example when they are with a client or working at home, network designers have developed new private network architectures for setting up links from some public networks, such as public switched telephone networks (PSTN) and public land mobile networks (PLMN). This presupposes that the terminals are compatible with the public networks.

Because of the complexity of the new architectures and problems with synchronizing public and private networks, users do not have the benefit of all the services offered by their private network if they are connected to it via a public network. This applies in particular to the function for automatically displaying the name(s) of the calling and/or called party.

The calling line identification presentation (CLIP) protocol has recently been introduced in an attempt to remedy this drawback. However, although CLIP messages reserve a field for the name of the calling party, this is never communicated by the public network to the private network.

Consequently, there is no entirely satisfactory method of providing private services to terminals that are disconnected from their private network.

An object of the invention is therefore to remedy this drawback.

SUMMARY OF THE INVENTION

To this end, the invention proposes a method of providing services to private terminals belonging to a private network including a private database containing primary identifiers of the private terminals associated with first data representative of services to which the private terminals have access within the private network and adapted to be connected to a public network including an intelligent platform and connected to the private network, which method includes:

a first step in which there is stored, at an address accessible to the intelligent platform, second data representative of at least a portion of the private database and, at an address of the public network, third data representative of the primary identifier of each private terminal, of the associated private network, and of the intelligent platform having access to the second data of the private network, and a second step in which, if a private terminal sends a service request over the public network, the third data associated with the primary identifier of the requesting private terminal is extracted, after which the data of the request is compared to the second data designated by the extracted third data to authorize or not the platform designated by the extracted third data to implement the required service.

In this context, "extracting data" means reading data without withdrawing it, and possibly then storing it, for example in a memory.

The method according to the invention can have any of the following additional features separately and/or in combination:

the second data is stored in an auxiliary database;

the third data is stored in a correspondence table in the form of a private terminal primary identifier, a secondary identifier associated with the private network to which the private terminal belongs, and a tertiary identifier associated with the intelligent platform having access to the second data of the private network;

there is stored, preferably in the first step, at an address accessible to the intelligent platform, a table of links between private networks authorized to communicate with each other;

the requests preferably include the primary identifier of the requesting private terminal and fourth data representative of a required action, which is preferably a service request, such as displaying the name of the calling and/or called party, or authorizing access to an in-house database, or a request for a link to another private terminal; some requests can further comprise fifth data representative of an authorization to access a service within their network; accordingly, even if the auxiliary base does not include any authorization of access to the service requested by the user stored in association with his identifier, the user can use the service, at least on a one-off basis, because he has communicated the corresponding code;

some of the second data can be representative of services subdivided into service levels; for example, a first level provides for name display only between users of the same private network, a second level provides for name display between users of different networks that have entered into an agreement, and a third level provides for display of the name of the calling party of the screen of a called party connected to a network that has not entered into an agreement with the private network;

the method further includes an auxiliary step in which there is stored, at an address accessible to the intelligent platform, a table of external relations including for at least some of the private terminals their primary identifier and a list of quaternary identifiers representative of terminals with which they are authorized to set up links; in particular, this makes it possible to set up links with some terminals of public or private networks that have not entered into an agreement with the private network of the requesting user; such lists can be communicated directly by the users to the intelligent platform if they have received the necessary authorization from their private network supervisor;

the method further includes an auxiliary step of updating the content of the auxiliary base and/or the correspondence table and/or the links table and/or the external relations table; one or more of these updates can be effected periodically or on demand.

The invention also provides a device for providing services to private terminals of a private network including a private database containing primary identifiers of the private terminals associated with first data representative of services to which the private terminals have access within the private network and adapted to be connected to a public network including an intelligent platform and connected to the private network, which device includes:

i. first storage means accessible to the intelligent platform and containing second data representative of at least a portion of the private database, ii. second storage means accessible on the public network and containing third data representative of the primary identifier of the private terminal, of the associated private network and of the intelligent platform having access to the second data of the private network, and iii. management means adapted, if a private terminal sends a service request over the public network, to extract from the second storage means the third data associated with the primary identifier of the requesting private terminal, and then to compare the data of the request to the second data designated by the extracted third data, to authorize or not the platform designated by the extracted third data to implement the requested service.

The device according to the invention can have any of the following additional features separately and/or in combination:

- it further includes an auxiliary database in which the second data associated with a private network is stored;
- the second storage means include a correspondence table which stores the third data in the form of a private terminal primary identifier, a secondary identifier associated with the private network to which the private terminal belongs, and a tertiary identifier associated with the intelligent platform having access to the second data of the private network;
- it further includes third storage means accessible to the intelligent platform and containing a table of links between private networks authorized to communicate with each other;
- some requests include the primary identifier of the requesting private terminal and fourth data representative of a required action chosen from a group comprising a service request and a request to link to another private terminal; these requests can further include fifth data representative of authorization to access at least one service within a network;
- some of the second data can be representative of services subdivided into service levels;
- it further includes fourth storage means accessible to the intelligent platform and including a table of external relations including, for at least some of the private terminals, their primary identifier and a list of quaternary identifiers representative of terminals with which they are authorized to set up links;
- it further includes updating means adapted to update the content of the auxiliary base and/or the correspondence table and/or the links table and/or the external relations table; the updating means are preferably installed on a link server dependent on the intelligent platform;
- at least some of the management means is preferably installed on a control server of the public network and can include the second storage means containing the correspondence table.

The invention can be implemented in any type of private or public communication network and in particular on the Internet, in a PLMN and in a PSTN in the case of public networks, for example, and in a TETRA and in a RUBIS network in the case of private networks, for example.

BRIEF DESCRIPTION OF THE DRAWING

Other features and advantages of the invention will become apparent on reading the following detailed description and referring to the single FIGURE of the accompanying drawing, which shows diagrammatically a multiple network communication installation equipped with a device according to the invention. The drawing is for the most part of a specific nature and consequently constitutes part of the description of the invention as well as contributing to the definition of the invention.

DETAILED DESCRIPTION OF THE PREFERRED EMBODIMENTS

Figure 1:
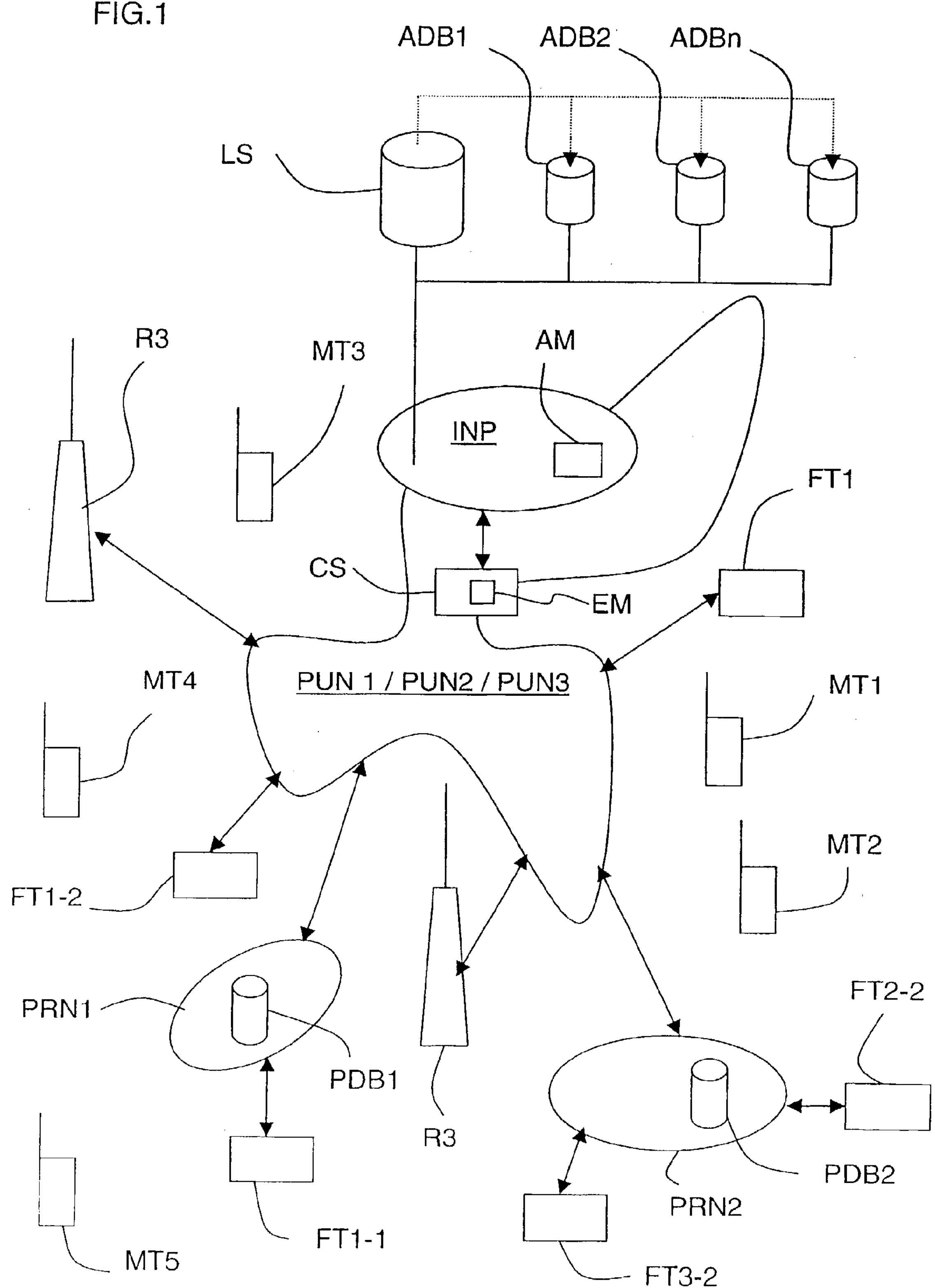

The communication installation shown in FIG. 1 includes public networks PUN1, PUN2 and PUN3 interconnected via an intelligent switching and routing platform INP that preferably belongs to one of them. The platform can consist of servers connected in accordance with the Internet Protocol (IP), for example, and providing routing analysis functions as well as routing and charge metering control functions. The number of public networks is not limited to three. It can take any integer value greater than or equal to one. The public networks PUN1, PUN2, PUN3 are the Internet, a PSTN, and a PLMN, for example. FIG. 1 shows two relay antennas R3 of the PLMN. In the example shown, an "independent" fixed terminal FT1 is associated with PUN2 (which is a PSTN in this example) and a mobile terminal MT5 is associated with PUN3 (which is a PLMN in this example).

The installation shown further includes first and second independent private networks PRN1 and PRN2, which are associated with respective private, fixed or mobile terminals and are connected to the public networks PUN1, PUN2, PUN3 via the intelligent platform INP. The number of private networks is not limited to three. It can take any integer value greater than or equal to one. In the example shown, one fixed terminal FT1-1 and two mobile terminals MT1, MT3 are associated with PRN1, and FT1-1 is the only terminal physically connected to PRN1. Three fixed terminals FT1-2, FT2-2, FT3-2 and two mobile terminals MT2, MT4 are associated with PRN2. FT1-2 is physically connected to one of the public networks, for example PUN1 (which is the Internet in this example), and FT2-2 and FT3-2 are physically connected to PRN2.

In the present context, "terminal" means any data processing unit able to exchange data with another remote data processing unit via cable and/or radio. It can refer in particular to landline or mobile telephones, fixed or portable computers, possibly with multimedia facilities, or personal digital assistants (PDA).

Each private network PRN1, PRN2 has a private database PDB1, PDB2 including in particular data representative of services that they offer to their users and enabling use of those services. Each private base PDB1, PDB2 includes a correspondence table which stores the primary identifiers of the private terminals of the users of the private network in association with the service or services to which they have access within the network, possibly together with levels of service. The primary identifier is a telephone number, for example, or an Internet e-mail address, or a personal identification number. Also, users having more than one primary identifier can be envisaged.

The services offered by the private networks include, for example, calling party display, called party display, three-way conference calls, or even conference calls with more than three participants, access to in-house professional databases, access to in-house messaging, filling in of in-house forms, free access to the Internet or to external databases, or applications providing access to instant messaging or chat functions.

The invention proposes a device intended to enable users of a private network connected to a public network to obtain some or all of the services to which they would be entitled if they were physically connected to the private network. Of course, this is feasible only if the supervisors of the public and private networks have entered into the necessary agreements.

The device includes, for each private network PRN1, PRN2, storage means that preferably take the form of an auxiliary database ADB1, ADB2 and contain a "copy" of at least a portion of the private database PDB1, PDB2. To be more precise, each auxiliary base ADB1, ADB2 includes data representative of personalized services to which their users (represented by one or more primary identifiers) are entitled when they are physically connected to a public network. This data also enables the public network, via the platform INP, to use the designated services to avoid having to go through the private network again, which would waste time, in particular if they include a firewall or an access control gateway (gateway-proxy).

As in the private base PDB1, PDB2, at least some of the data in the auxiliary bases ADB1, ADB2 (primary identifier (s), accessible service(s), authorized service level(s)) is preferably stored in a correspondence table.

Because their content is generally confidential, the auxiliary databases ADB1, ADB2 are preferably connected to the intelligent platform INP via a dedicated link server LS. They are preferably installed on the same premises as the server LS and the platform INP, for security reasons. However, the auxiliary bases could be remote from the platform and connected to it via a secure private network.

The device further includes other storage means that are preferably installed on a control server CS of each public network PUN and contain, preferably in the form of a correspondence table, data representative of the primary identifier of each private terminal, of the secondary identifier of the associated private network PRN, and the tertiary identifier of the intelligent platform INP having access to the data of the auxiliary base ADB of the private network PRN.

If several private networks PRN coexist, the table can be subdivided into subtables each associated with a private network.

Of course, the storage means could be installed on a link server LS of the intelligent platform INP or on the platform itself.

The device also includes management means including an extraction module EM that is preferably installed on the control server CS of each public network PUN. The extraction module EM is accessible in the public network PUN at the address to which the private users have chosen to send their service (or link) requests. In other words, if a user connected to a public network PUN wants to use a service offered by his private network PRN, he formulates a request and sends it to the address of the extraction module EM, so that the latter extracts from the correspondence table stored in the control server CS the secondary and tertiary identifiers associated with the primary identifier of the private terminal that sent the request. Of course, if the installation includes only one intelligent platform, it is no longer necessary to provide it with a tertiary identifier of its own. A tertiary identifier is useful only if a number of intelligent platforms coexist within the installation.

The identifiers extracted from the table enable the extraction module EM to transmit the request to an analysis module AM that is part of the management means and is preferably installed on the intelligent platform INP which stores the auxiliary base ADB associated with the private network PRN to which the requesting private terminal belongs. If the request does not include the secondary identifier associated with the private network PRN, the extraction module EM transmits it with the request to the platform INP. On receiving this data (request and identifier (s)), the analysis module AM installed on the intelligent platform INP sends the link server LS data designating the auxiliary base ADB and the requesting private network, in order for it to extract from the auxiliary base ADB the information associated with the requesting terminal and communicate it to the analysis module AM. The latter then compares the data contained in the request and the data extracted from the auxiliary base, to determine if the requesting user is authorized to use the service that he is requesting or to set up the link that he is requesting, where applicable with the required level of service.

If the data matches, the analysis module AM requests the link server LS to extract from the auxiliary base ADB the data that will enable it to provide the requested service or the requested link. Once extracted, this data is communicated to the intelligent network INP so that it can satisfy the request, without going through the user's private network PRN.

Some requests can include data representative of a specific code authorizing the user for one-off use of a particular service even though the auxiliary base does not authorize them there. In this case, the analysis module AM requests the link server LS directly to extract from the corresponding auxiliary base the information that will enable the platform INP to provide the required service.

Information tied to requests and communications can be saved in the auxiliary bases ADB for transmission to the private network concerned or to a third party organization for specific processing (charge metering, call logging, statistics, incidents, etc.), either periodically or at the request of a private network supervisor.

Moreover, to be able to provide links between terminals belonging to private networks, it is advantageous to provide other storage means including a table of links. The storage means in question are preferably installed on the link server LS of the intelligent platform INP. The links table defines all authorized links between private networks and the associated specific services. This authorizes bidirectional relations, but relations are unidirectional in terms of their routing, to prevent setting up prohibited links.

The device can further include other storage means for storing one or more other tables of special external relations defining for some private terminals an association between their primary identifier and a list of quaternary identifiers that are representative of terminals with which they are authorized to set up links. This type of table is particularly beneficial for communicating with clients with no internetwork agreement. The storage means are preferably installed on the link server LS of the intelligent platform INP or directly on the auxiliary base ADB1, ADB2 concerned. The former solution is advantageous if one table is shared by the private networks PRN1, PRN2. The latter solution is preferable if each private network PRN1, PRN2 has its own external relations table.

The data contained in the auxiliary bases and in the links and correspondence tables is preferably updated by a dedicated updating module (not shown) of the device, installed on the intelligent platform INP or on its link server LS. Depending on the applicable constraints (frequency of modifications, quality of service, security level, etc.), this module can operate either periodically or on demand, at the request of a private network supervisor. Updating is effected either by downloading data communicated by the private network PRN via a public network PUN or manually using data copied onto a storage medium such as a CD-ROM or removable hard disk.

For security reasons, updating can include a routine for declaring the identifier of the entity requesting the update (identification of the private network, identification-authentication of the requesting entity (possibly with an exchange of messages), identification of the operation and its content (service and service level)).

In the case of tables defining links between user private terminals and lists of terminals, a dedicated procedure can be envisaged for updates initiated by each user wishing to modify his own list.

Moreover, the device can be made secure. To this end, the intelligent platform INP preferably offers secure access and the security architecture is provided by the public or private network operator. Security is preferably provided by identification, authentication and/or encryption procedures, in particular for transferring data. A public key infrastructure (PKI) architecture can be used, for example, in which the function of the confidence third party issuing certificates is provided by the proprietor of the private network or by the public network operator.

The extraction, analysis and updating modules can be implemented in the form of hardware and/or software. Moreover, the analysis and updating modules could be combined in the same module. Such modules, when they are implemented in software, can be readily installed, either in situ, for example using a memory medium such as a CD-ROM, or remotely by downloading (secure downloading if necessary).

The invention also offers a method intended for private networks including a private database containing the primary identifiers of their private terminals associated with first data representative of the services to which they have access within the private network, and for public networks that include an "intelligent" switching and routing platform and are connected to said private networks.

This method can be implemented using the device previously described. Because the main and optional functions and subfunctions implemented by the steps of this method are substantially identical to those provided by the various means constituting the device, only the steps implementing the main functions of a method according to the invention are described hereinafter.

That method includes i) a first step in which, at an address accessible to the intelligent platform INP, second data (auxiliary base ADB1, ADB2) is stored that is representative of at least a portion of the private database PRN1, PRN2, and, at an address of the public network PUN, third data (correspondence table) is stored that is representative of the primary identifier of each private terminal FT, MT of the associated private network PRN1, PRN2 and of the intelligent platform INP having access to the second data of said private network, and ii) a second step in which, if one of the private terminals FT, MT sends a service request on the public network PUN, third data (correspondence table) associated with the primary identifier of the requesting private terminal is extracted, after which the data of the request is compared to the second data (auxiliary base ADB1, ADB2) designated by the extracted third data, to authorize or not the platform INP designated by the extracted third data (correspondence table) to provide the requested service.

A few examples of request processing are described next, lumping together a user and his terminal and likewise lumping together the link server LS, the analysis module AM and the intelligent platform INP.

Three levels of service are defined in the following examples. The level S1 is assigned to remote private terminals that are authorized to use the "name presentation" service for an internal communication, i.e. one reserved for exchanges within their private network. The level S2 is assigned to remote private terminals that are authorized to use the "name presentation" service during communication with terminals belonging to a private network other than their own, but with which there is an agreement for connection and the use of some data from their respective internal bases. The level S3 is assigned to remote private terminals that are authorized to use the "name presentation" service when communicating with any terminal listed in the special external relations table stored in the auxiliary base ADB1, ADB2 associated with the user's private network PRN1, PRN2 or in the link server LS.

In a first example, the private mobile terminal MT1 associated with the private network PRN1, but currently disconnected from the network, wishes to set up a link with the mobile terminal MT3 that is also associated with the private network PRN1 and disconnected therefrom. MT1 is authorized to use the three service levels S1, S2 and S3. This service information is therefore stored in the auxiliary base ADB1 in association with the primary identifier of MT1.

MT1 generates on the public network PUN3 (which here is a PLMN) a request intended to set up a link with MT3. The request is transmitted to the address of the extraction module EM, which in this example is installed on the control server CS of the public network PLMN. The extraction module EM then consults the correspondence table stored in the server CS to extract therefrom the data associated with the primary identifier of MT1, and in particular the secondary identifier of PRN1 and the tertiary identifier of the platform INP associated with the auxiliary base ADB1 of PRN1. The module EM then transmits the request and the extracted identifiers to the platform INP via the public network PLMN. The platform then consults the auxiliary base ADB1 to extract therefrom the data associated with MT1.

INP compares the data extracted from ADB1 to that received. The request aiming to set up a link with the mobile terminal MT3 of the private network PRN1, MT1 requires the authorization S1. This is the case here. INP then determines in the auxiliary base ADB1 if MT3 is in fact part of the private network PRN1. This is the case here.

INP deduces from this that the request can be satisfied. It then extracts from the auxiliary base ADB1 the stored information that enables it to implement the service level S1 requested by MT1. INP then transmits to MT3, over the public network PLMN, the information necessary for setting up the link with MT3, including the name of the user of MT1 (requested service).

In a second example, the private mobile terminal MT1 associated with the private network PRN1, but disconnected therefrom, wishes to set up a link with the mobile terminal MT2 associated with the private network PRN2 and disconnected therefrom. MT1 is authorized to use the three service levels S1, S2 and S3. This service information is therefore stored in the auxiliary base ADB1 in correspondence with the primary identifier of MT1. Also, the data representative of the authorized link between the two private networks PRN1 and PRN2 is stored in the links table installed on the platform INP.

MT1 generates on the public network PUN3 (which here is a PLMN) a request intended to set up a link with MT2. The request is transmitted to the address of the extraction module EM, which here is installed on the control server CS of the public network PLMN. The extraction module EM then consults the correspondence table stored in the server CS to extract therefrom the data associated with the primary identifier of MT1, and in particular the secondary identifier of PRN1 and the tertiary identifier of the platform INP associated with the auxiliary base ADB1 of PRN1. The module EM then transmits the request and the extracted identifiers to the platform INP via the public network PLMN. The platform then consults the auxiliary base ADB1 to extract therefrom the data associated with MT1.

INP compares the data extracted from ADB1 with that received. Because the request aims to set up a link with the mobile terminal MT2 of the private network PRN2, MT1 must have the authorization S2. This is the case here. INP then consults the links table to determine if the link between PRN1 and PRN2 is authorized. This is the case here. INP then determines from the auxiliary base ADB2 if MT2 is part of the private network PRN2. This is the case here.

INP deduces from this that the request can be satisfied. It then extracts from the auxiliary base ADB1 the stored information that will enable it to implement the service level S2 requested by MT1. INP then transmits to MT2, over the public network PLMN, the information needed to set up the link with MT2, including the name of the user of MT1 (required service).

In a third example, the private mobile terminal MT1 associated with the private network PRN1, but disconnected therefrom, wishes to set up a link with the mobile terminal MT5 of one of its special clients, which is connected by a radio link to the public network PUN3 (which here is a PLMN). MT1 is authorized to use the three service levels S1, S2 and S3. This service information is therefore stored in the auxiliary base ADB1 in association with the primary identifier of MT1. The data representative of the authorized link between MT1 and MT5 is stored in the special external relations table installed on the platform INP.

MT1 generates on the public network PUN3 (which here is a PLMN) a request intended to set up a link with MT5. The request is transmitted to the address of the extraction module EM, which here is installed on the control server CS of the public network PLMN. The extraction module EM then consults the correspondence table stored in the server CS to extract therefrom the data associated with the primary identifier of MT1, and in particular the secondary identifier PRN1 and the tertiary identifier of the platform INP associated with the auxiliary base ADB1 of PRN1. The module EM then transmits the request and the extracted identifiers to the platform INP via the public network PLMN. The platform then consults the auxiliary base ADB1 to extract therefrom the data associated with MT1.

INP compares the data extracted from ADB1 with that received. Because the request aims to set up a link with the mobile terminal MT5 that does not belong to a private network with which its private network PRN1 has an agreement, MT1 requires the authorization S3. This is the case here. INP then determines from the special external relations table if the link between MT1 and MT5 is authorized. This is the case here.

INP deduces from this that the request can be satisfied. It then extracts from the auxiliary base ADB1 the stored information that will enable it to implement the service level S3 requested by MT1. INP then transmits to MT5 over the public network PLMN the information necessary to set up the link with MT5, including the name of the user of MT1 (required service).

Many other situations can be envisaged, in particular situations involving fixed terminals connected to private or public networks.

The invention is not limited to the embodiments of methods and devices described above by way of example only, but encompasses any variant thereof within the scope of the following claims that might suggest itself to the person skilled in the art.

The invention can with advantage use the data and the platforms INP to manage the concept of relative priority of the services offered on public networks. Thus a "security" call could have priority for using the resources of the public networks through recognition of its belonging to a special category of subscribers.

The invention claimed is:

1. A method of providing services to private terminals belonging to a private network including a private database containing primary identifiers of said private terminals associated with first data representative of services to which said private terminals have access within said private network and adapted to be connected to a public network including an intelligent platform and connected to said private network, which method includes:

a first step in which there is stored, at an address accessible to the intelligent platform, second data representative of at least a portion of said private database and, at an address of said public network, third data representative of said primary identifier of each private terminal, of the associated private network, and of said intelligent platform having access to said second data of said private network, and a second step in which, if a private terminal sends a service request over said public network, said third data associated with said primary identifier of the requesting private terminal is extracted, after which the data of said request is compared to the second data designated by the extracted third data to authorize or not the platform designated by said extracted third data to implement said required service.

2. The method claimed in claim 1 wherein said second data is stored in an auxiliary database.

3. The method claimed in claim 1 wherein said third data is stored in a correspondence table in the form of a private terminal primary identifier, a secondary identifier associated with the private network to which said private terminal belongs, and a tertiary identifier associated with said intelligent platform having access to said second data of said private network.

4. The method claimed in claim 1 wherein, in said first step, there is stored, at an address accessible to said intelligent platform, a table of links between private networks authorized to communicate with each other.

5. The method claimed in claim 1 wherein said requests include said primary identifier of the requesting private terminal and fourth data representative of a required action chosen from the group comprising a service request and a request for a link to another private terminal.

6. The method claimed in claim 5 wherein some requests further comprise fifth data representative of an authorization to access a service within their network.

7. The method claimed in claim 1 wherein some of said second data is representative of services subdivided into service levels.

8. The method claimed in claim 1 further including an auxiliary step in which there is stored, at an address accessible to said intelligent platform, a table of external relations including for at least some of said private terminals their primary identifier and a list of quaternary identifiers representative of terminals with which they are authorized to set up links.

9. The method claimed in claim 2 further including an auxiliary step of updating the content of said auxiliary base and/or said correspondence table and/or said links table and/or said external relations table.

10. Use of a method as claimed in claim 1 in public networks chosen from the group consisting of the Internet, public land mobile networks and public switched telephone networks.

11. A device for providing services to private terminals of a private network including a private database containing primary identifiers of said private terminals associated with first data representative of services to which said private terminals have access within said private network and adapted to be connected to a public network including an intelligent platform and connected to said private network, which device includes:

i. first storage means accessible to said intelligent platform and containing second data representative of at least a portion of said private database, ii. second storage means accessible on said public network and containing third data representative of said primary identifier of said private terminal, of the associated private network and of said intelligent platform having access to said second data of said private network, and iii. management means adapted, if a private terminal sends a service request over said public network, to extract from said second storage means said third data associated with said primary identifier of the requesting private terminal, and then to compare the data of said request to said second data designated by said extracted third data, to authorize or not said platform designated by said extracted third data to implement said requested service.

12. The device claimed in claim 11 further including an auxiliary database in which said second data associated with a private network is stored.

13. The device claimed in claim 11 wherein said second storage means include a correspondence table which stores said third data in the form of a private terminal primary identifier, a secondary identifier associated with the private network to which said private terminal belongs, and a tertiary identifier associated with said intelligent platform having access to said second data of said private network.

14. The device claimed in claim 11 further including third storage means accessible to said intelligent platform and containing a table of links between private networks authorized to communicate with each other.

15. The device claimed in claim 11 wherein some requests include said primary identifier of the requesting private terminal and fourth data representative of a required action chosen from a group comprising a service request and a request to link to another private terminal.

16. The device claimed in claim 15 wherein some requests further include fifth data representative of authorization to access at least one service within a network.

17. The device claimed in claim 11 wherein some of said second data is representative of services subdivided into service levels.

18. The device claimed in claim 11 further including fourth storage means accessible to said intelligent platform and including a table of external relations including, for at least some of said private terminals, their primary identifier and a list of quaternary identifiers representative of terminals with which they are authorized to set up links.

19. The device claimed in claim 12 further including updating means adapted to update the content of said auxiliary base and/or said correspondence table and/or said links table and/or said external relations table.

20. The device claimed in claim 19 wherein said updating means are installed on a link server of said intelligent platform.

21. The device claimed in claim 11 wherein at least some of said management means is installed in a control server of said public network.

22. The device claimed in claim 21 wherein said second storage means are installed on said control server.

23. The device claimed in claim 11 wherein said intelligent platform offers secure access.

24. Use of a device as claimed in claim 11 in public networks chosen from the group consisting of the Internet, public land mobile networks and public switched telephone networks.

* * * * *